United States Patent [19]
Thompson

[11] 4,411,919
[45] Oct. 25, 1983

[54] MEAT ADHEARING COOK-IN PACKAGING

[75] Inventor: Henry B. Thompson, Duncan, S.C.

[73] Assignee: W. R. Grace & Co., Cryovac Division, Duncan, S.C.

[21] Appl. No.: 408,550

[22] Filed: Aug. 16, 1982

[51] Int. Cl.³ .......................................... B65B 29/08
[52] U.S. Cl. .................................. 426/412; 426/415; 426/129; 204/159.2; 204/168
[58] Field of Search ............... 426/412, 415, 234, 107, 426/129, 113, 127, 410; 204/165, 168, 169, 159.2

[56] References Cited

U.S. PATENT DOCUMENTS

| | | | |
|---|---|---|---|
| 2,071,300 | 2/1937 | Gammeter | 426/412 |
| 2,174,924 | 10/1939 | McCleary | 426/412 |
| 2,767,103 | 10/1956 | Loukomsky . | |
| 3,017,302 | 1/1962 | Hultkrans | 426/412 |
| 3,144,399 | 8/1964 | Rainer et al. | 426/234 |
| 3,171,539 | 3/1965 | Holbrook et al. | 426/234 |
| 3,227,605 | 1/1966 | Wolinski . | |
| 3,294,621 | 12/1966 | Baird et al. | 426/412 |
| 3,330,748 | 7/1967 | Lawton . | |
| 3,552,982 | 1/1971 | Savidge | 426/412 |
| 3,607,312 | 9/1971 | Ready | 426/393 |
| 3,625,348 | 12/1971 | Titchenal et al. | 426/415 |
| 3,648,834 | 3/1972 | Gifford et al. | 426/234 |
| 3,784,711 | 1/1974 | Kane | 426/130 |
| 3,870,610 | 3/1975 | Baird et al. . | |
| 3,966,980 | 6/1976 | McGuckian | 426/393 |
| 4,104,404 | 8/1978 | Bieler et al. | 426/127 |
| 4,120,716 | 10/1978 | Bonet . | |
| 4,218,486 | 8/1980 | Bieler et al. | 426/393 |

FOREIGN PATENT DOCUMENTS

| | | | |
|---|---|---|---|
| 116197 | 12/1942 | Australia | 426/412 |
| 656630 | 1/1963 | Canada | 426/412 |
| 713324 | 7/1965 | Canada | 426/412 |
| 717835 | 9/1965 | Canada | 426/234 |
| 1078247 | 8/1980 | Canada . | |
| 1100353 | 5/1981 | Canada . | |
| 2744713 | 10/1977 | Fed. Rep. of Germany | 426/412 |
| 802747 | 10/1958 | United Kingdom | 426/412 |
| 805985 | 12/1958 | United Kingdom | 426/412 |

OTHER PUBLICATIONS

Principles of Package Development, 1972, Griffin et al., Avi. Publ.
Food Processing, 5/78, Andres.
Cry-Ovac-Bulletin C, 1939.

*Primary Examiner*—Steven L. Weinstein
*Attorney, Agent, or Firm*—John J. Toney; William D. Lee, Jr.; Frank A. Peacock

[57] ABSTRACT

A method is provided for enhancing yield of a cook-in packaged food product that includes first providing an adhering cook-in package comprising a flexible plastic container being substantially conformable to a selected food product and having an inner surface of polymeric olefin having been subjected to an adhering surface treatment in the presence of oxygen, then conforming said package about a selected food product and cooking the packaged product, whereupon said inner package surface adheres to said food product to substantially prevent cook-out of fluids therefrom.

11 Claims, 1 Drawing Figure

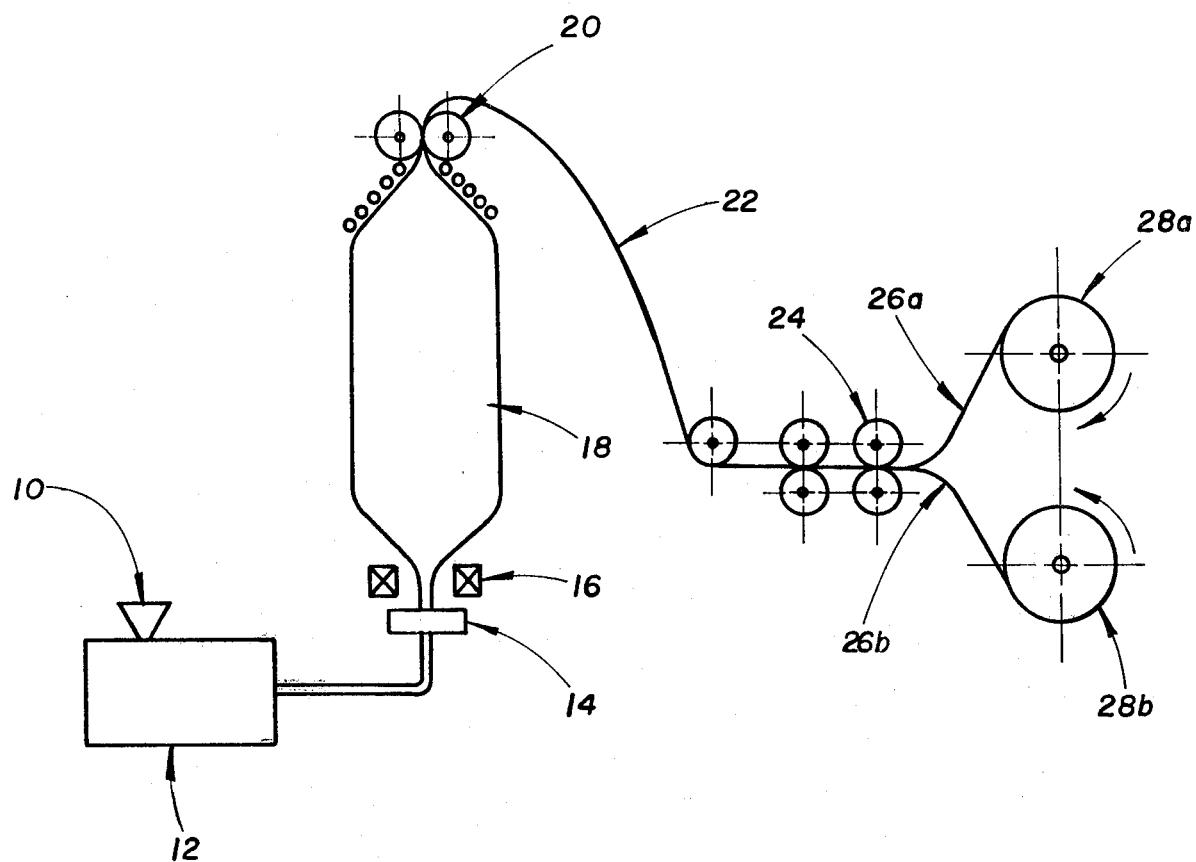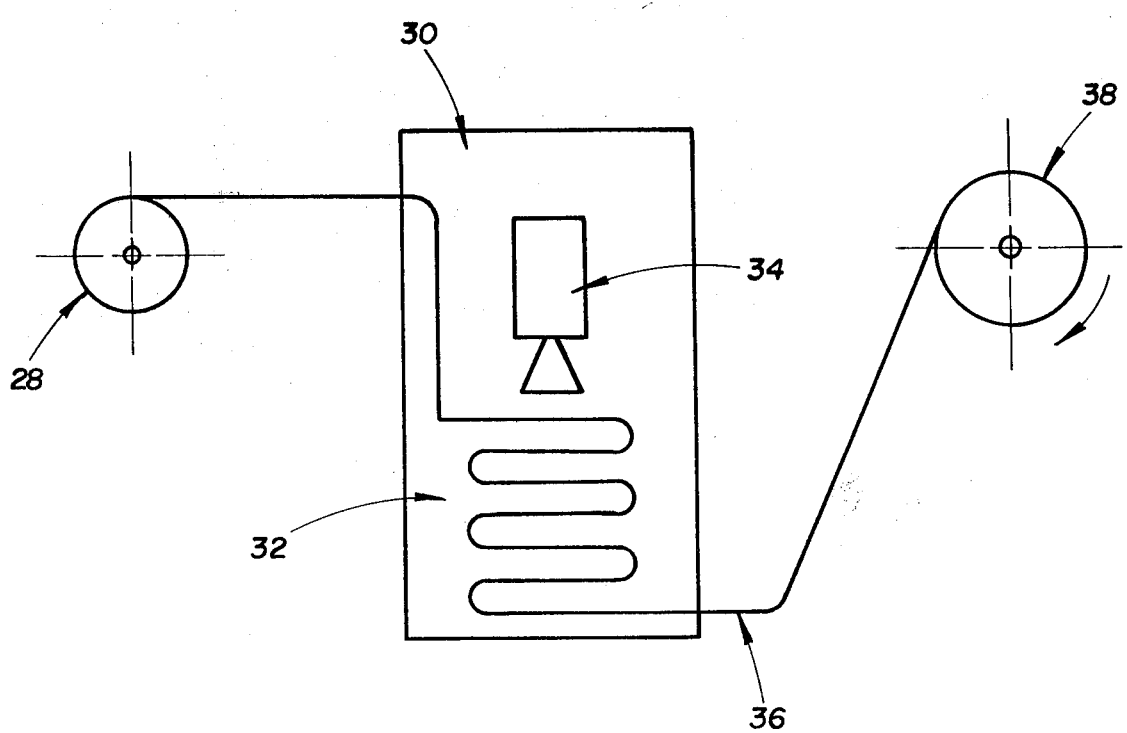

MEAT ADHEARING COOK-IN PACKAGING

BACKGROUND OF THE INVENTION

This invention relates generally to plastic packaging films suitable for cook-in packaging and their use. More particularly, this invention relates to cook-in food packages having food-contact surface characteristics which promote adherence of the casing to a contained food product during cook-in.

Many foods during preprocessing are stuffed into a casing and then placed in a heated medium, such as a hot water bath, for cook-in to produce a pre-cooked, encased food product. The term "cook-in" conventionally refers to cooking of a food product while contained in a package. It is desirable that a cook-in package closely conform to the contained food product to prevent "cook-out", i.e. exudation of fluids from the food product during cooking. By restricting exudation of fluids from a cook-in contained food product, the yield of the precooked food product is increased, since fluid retention tends to increase product yield.

Of general interest concerning cook-in packaging is the disclosure of U.S. Pat. No. 4,104,404 issued Aug. 1, 1978 to Bieler et al for "Cross-linked Amid/Olefin Polymeric Tubular Film Coextruded Laminates", directed to a multilayer cook-in film produced by coextrusion and irradiative cross-linking. Also of interest is the disclosure of Canadian Pat. No. 1,078,247 issued Aug. 27, 1980 to Thompson for "Heat Shrinkable Laminate", directed to a multiply cook-in film having a heat shrinkable layer between a barrier layer and a heat sealable layer. Of interest is the disclosure of U.S. Pat. No. 3,607,312 issued Sept. 21, 1971 to Ready for "Method of Preparing and Preserving Ready to Eat Foods", directed to a pre-cooking and chilling procedure for a pre-cooked food product packaged in a polyethylene/nylon multiply film. Of interest is the disclosure of Canadian Pat. No. 1,100,353 issued May 5, 1981 to Bieler for "Package and Process for Preparing Scrambled Eggs", directed to cook-in of eggs in a package of multiply film having a center layer of nylon between outer layers of cross-linked polyethylene.

Of general interest concerning irradiative treatment of polymeric materials is the disclosure of U.S. Pat. No. 3,330,748 issued July 11, 1967 to Lawton for "Method and Apparatus for Irradiating Organic Polymers With Electrons", directed to passing repeatedly a polyethylene film through a high radiation field such that the accumulated radiation dose resulting from all the passes yields the desired dosage everywhere in the film being continuously produced. Also of general interest is the disclosure of U.S. Pat. No. 3,144,399 issued Aug. 11, 1964 to Rainer et al for "Polyethylene Product", directed to irradiative cross-linking of polyethylene.

Of general interest concerning adhering surface treatment of polymeric materials is the representative disclosure of U.S. Pat. No. 4,120,716 issued Oct. 17, 1978 to Bonet for "Method of Applying Printed Labels to Flexible Envelopes Using Corona Discharge Treatment", directed to improvement of adherence characteristics of the surface of polyethylene by corona treatment to oxidize the polyethylene surface to promote wetting by printing inks and adhesives. Of general interest concerning flame surface treatment of polymeric film is the representative disclosure of U.S. Pat. No. 2,767,103 issued Oct. 16, 1956 to Loukomsky for "Method and Apparatus for Treatment of Polyethylene". Of general interest concerning ultra violet surface treatment of polymeric film is the representative disclosure of U.S. Pat. No. 3,227,605 issued January 4, 1966 to Wolinski for "Method of Treating Polyethylene with Ozone to Render it Adherent to Coatings and Lamina and Resultant Articles". Of general interest concerning plasma surface treatment of polymeric film is the disclosure of U.S. Pat. No. 3,870,610 issued Mar. 11, 1975 to Baird et al for "Cold Plasma Treatment of Materials".

SUMMARY OF THE INVENTION

The present invention is directed to an improved cook-in procedure wherein a cook-in package adheres to a contained food product during cook-in to restrict cook-out of fluids from the food product thereby increasing food product yield.

Accordingly, there is provided a method for enhancing yield of a cook-in packaged food product that includes the steps of first providing an adhering cook-in package comprising a flexible plastic container being substantially conformable to a selected food product and having an inner surface of polymeric olefin having been subjected to an adhering surface treatment in the presence of oxygen, then conforming said package about a selected food product and cooking the packaged product, whereupon said inner package surface adheres to said food product to substantially prevent cook-out of fluids therefrom. Preferably, the package is a tubular casing having an inner surface of hot blown polyethylene which has been irradiatively cross-linked in the presence of oxygen.

BRIEF DESCRIPTION OF THE DRAWING

Further details are given below with reference to the drawing wherein a schematic illustration depicts a preferred process for making a preferred film from which packages according to the invention may be made.

DESCRIPTION OF THE PREFERRED EMBODIMENTS

There are several essential features of the invention which enhance the product yield of a precooked packaged food product by providing a cook-in package having an inner surface or food contact surface that adheres to the contained food product during cook-in thereby preventing cook-out of fluids from the contained food product. The cook-in package may be made from either multiply or singleply packaging film so long as the inner surface of the package is a polymeric olefin acceptable for food contact and treated in accordance with the invention. Polyethylene, polypropylene, and EVA are representative examples of polymeric olefins acceptable for food contact. It is noted that the term "polymer" and similar terms are used herein in the conventional sense to include homopolymers, copolymers, terpolymers, and the like; and the term "polymeric olefin" is intended to include polymers having a major constituent of polymeric olefin. The inner surface of the package is subjected to an adhering surface treatment which is believed to oxidize the parafin-like surfaces of polyethylene and polypropylene for example, which renders the surface characteristics more compatible with the surface characteristics of meat products for example. Various oxidative treatments are cited above which include oxidation of polymeric surfaces by corona discharge, flame, plasma, and ultraviolet treatment, and, in general, treatments which expose the polymeric surface to energetic radiation in the presence of oxygen, all of which are considered to be within the scope of the present invention. Irradiation, such as electron beam irradiation, is commonly used to cross-link thermoplastic polymers and, if of low enough intensity, may be limited to surface treatment if that limitation is desired in view of the desired overall treatment of the film. It has been discovered that if cross-linking of a plastic packaging film is conducted such that the surface intended to form the food contact surface in the finished package is maintained in the presence of oxygen during cross-linking, the surface will be rendered adherable to contained food products during cook-in. Thus, the adhering surface treatment may advantageously be accomplished simultaneously with crosslinking of the film overall. At the least, however, film surface treatment must be sufficient in extent to provide cook-in adherence for a given film and food product combination.

There are at least two modes in which this combination irradiative treatment may be carried out. It is usual in the manufacture of polymeric packaging film to hot blow a tubular film which may be used to economic advantage to form a chain of packaging bags, such as side-sealed bags, or a series of seamless tubular food casings. This hot blown tubular film is then cross-linked by collapsing the tube to a lay-flat configuration and passing through a radiation field, such as electron beam radiation, after which it may be subjected optionally to further processing treatments such as orientation with reinflation of the tube to impart shrink properties to the film. Thus, it is seen that during irradiative cross-linking of a tubular film in conventional practice, the interior surface of the tube is not exposed to oxygen since the tube is collapsed, which will eventually become the inner surface of packaging bags made from this tubular film. In a preferred mode of the present invention, the tubular film is converted to sheet form by cutting the tube one or more times longitudinally to yield one or more sheets of flat film. These sheets of packaging film are then irradiatively cross-linked; and since the tubular film has been laid open to sheet form, the surfaces of the film are exposed to air, thereby permitting oxidation of the film surfaces. In an alternative though less preferred method, the hot blown tubular film is not collapsed during irradiative cross-linking but rather is maintained in the inflated condition with an air current passing therethrough during irradiation so that the interior surface of the tubular film is oxidized. Thus, when casings or bags are made from this tubular film, their inner surface, which becomes the food contact surface, has been subjected to an adhering surface treatment in accordance with the invention. Multiply coextruded films may be similarly handled and thus are considered to be within the scope of the invention.

There is another requirement of the invention in that the package made from the surface treated film be conformable to a selected food product. For example, tubular casings are conventionally stuffed with a flowable food product to form a food log of uniform diameter within the casing. Thus, the package in the form of a casing conforms to the food product contained therein. In the case of semi-rigid food products, such as whole poultry, shrink bags are preferably used such that during the cook-in process, for example in a hot water bath, the shrinkable bag is elevated to its shrink temperature thereby contracting snuggly around the contained food product. Thus, the requirement of package conformability simply refers to configurations that bring the inner surface of the cook-in package substantially uniformly against the surface of the contained food product so that the adhering surface characteristics of the interior of the bag are given an opportunity to function thereby preventing cook-out of fluids during cook-in.

A preferred embodiment of the invention is a cook-in package of hot blown, singleply, irradiatively cross-linked, nonoriented polyethylene film from which economical cook-in casings for a flowable meat product can be made. In the drawing, there is schematically illustrated a preferred process for making such film which includes an adhering surface treatment according to the invention. At 10 a polymer resin, such as low density polyethylene, is fed to a conventional extruder 12 from which it is extruded at about 350° F. through die 14, then passed through air ring 16 as an inflated bubble as indicated at 18. The nascent bubble is then collapsed by nip rollers 20, with the collapsed tube 22 being passed through conventional slitter 24 which opens the tube into two sheets 26a,b which are accumulated respectively on takeup rolls 28a,b. These accumulated sheets are termed single wound film roll stock. The polyethylene roll stock is then fed as shown at 28 to a conventional irradiation chamber 30 and passed in a festooned pattern as indicated at 32 through an irradiation field emanating from a convential source 34, such as an electron beam accelerator. During this irradiation step, the roll stock film is cross-linked and surface oxidized on both surfaces, which will be the final condition of the film at 36 for accumulation on takeup roll 38. The cross-linked and surface treated film is then later fed from roll 38 to a conventional bag making operation (not shown) to form for example back-seamed casings or bags having an overlap seal or a fin seal. Alternatively, a multiply package may be made using this film by extrusion coating additional polymeric layers onto a tube reformed from said treated roll stock prior to bag making, or by laminating additional polymeric layers onto said treated roll stock. In all cases however, said treated film must form the interior of the completed package.

Representatively in use, a casing made in accordance with the invention is uniformly stuffed with a flowable meat product and then submerged in a near boiling water cooking bath for an appropriate time. The inner surface of the uniformly stuffed casing closely conforms to the contained meat product and, because of the adhering surface treatment of the invention, the inner surface of the casing attaches to the meat product during cook-in thereby retaining fluids in the meat product. After this pre-cooling operation, the meat product may be sold encased in the cook-in casing, or it may be thinly sliced with the casing, or the casing may be stripped from the precooked meat log for further processing. It has been observed that some meat products, such as ham, are readily strippable from the casing after cook-in, while others, such as poultry, are not readily strippable such that in removing the casing from the cooked meat log some of the meat product may be lost due to small chunks remaining on the stripped casing. Since product yield is based on finished weight, it is believed that in most cases this chunking off of some of the meat product will be more than offset by the enhanced weight of retained fluids.

As an example, in a conventional ham mold operation, irradiation treated and corona treated cook-in casings were evaluated. Casing type A was a 1.5 mil 8-10MR irradiated polyethylene casing. Casing type B was a 1.5 mil maximum corona treated polyethylene casing, i.e. corona treated just short of discoloring the film. Casing type C was a 1.5 mil minimum corona treated polyethylene casing, i.e. corona treated to the point just short of ink adherence. In types A, B, and C, film treatment was such that the food contact surface in each case was in the presence of air. Casing type D was multiply seamless tubing having an outer layer of polypropylene and an inner layer of polyethylene cross-linked in collapsed tubing form, then oriented, and then post-irradiated to 20MR. The inner surface of type D was not treated in the presence of air due to irradiation being conducted with the tubular film in the collapsed configuration. All test casings were stuffed with ham and then put in a water sprayed smoke house at somewhat less than 212° F. On visual inspection, there was no difference in adhesion with either the corona treated or the irradiated polyethylene casings (types A,B,C) which advantageously had no cook-out. However, the hams cooked in type D casings had a 3.1% cook-out and no adhesion, i.e. there was a 3.1% weight loss on cooking due to exuded fluids. The only measurable loss that took place with test casings A, B and C was in the removal of the casings with most of the meat loss due to meat entrapment in the folded ends of the casings. This actual surface loss was minimal being as low as 0.32% on type A casings and up to 1.11–1.15% on types B and C casings. This increase for types B and C over type A was observed to be due to meat loss at the end folds of the casings and not due to cook-out.

In another example, evaluation was made of irradiated polyethylene casings versus similar but unirradiated casings. The casings were 3 mils in thickness, with the irradiated type having received a dosage of 8-10MR while maintaining the food contact surface in the presence of air. Massaged turkey thighs were stuffed in rolls of 4.75 inches diameter and 36 inches length at an average weight of 21 pounds per roll. The encased product was water cooked to an internal temperature of 160° F. and then chilled to 36° F. The irradiated film packaged product advantageously displayed film-to-product adhesion, while the non-irradiated film packaged product had no adhesion and produced a cook-out resulting in a 10% yield loss difference.

Although the present invention has been described in conjunction with preferred embodiments, it is to be understood that modifications and variations may be utilized without departing from the principles and scope of the invention, as those skilled in the art will readily understand. Accordingly, such modifications and vairations may be practiced within the scope of the following claims:

What is claimed is:

1. A method for enhancing yield of cook-in packaged meat product, comprising:
    (a) providing an adhering cook-in package comprising a flexible plastic container being substantially conformable to a selected meat product and having an inner meat product contacting surface of polymeric olefin having been subjected to an energetic radiation surface treatment in the presence of oxygen sufficient to cause said inner surface to adhere to the meat product during cook-in, said container having been formed from hot blown tubular film;
    (b) conforming said package about a selected meat product; and
    (c) cooking the packaged product, whereupon said inner surface adheres to said meat product to substantially prevent cook-out of fluids therefrom.

2. The method of claim 1 wherein said inner surface is oxidized polymeric olefin.

3. The method of claim 1 wherein said container is a tubular casing and said conforming is by stuffing.

4. The method of claim 1 wherein said container is a heat shrinkable bag and said conforming is by container shrinkage upon initiation of said cooking.

5. The method of claim 1 wherein the interior surface of said tubular film forms said inner container surface.

6. The method of claim 5 wherein said tubular film has been laid open prior to said surface treatment.

7. The method of claim 5 wherein said surface treatment has been conducted on said tubular film while flushing the interior of said tubular film to maintain an oxidative atmosphere therein.

8. The method of claim 1 wherein the exterior surface of said tubular film forms said inner container surface and said tubular film has been laid open after said surface treatment.

9. The method of claim 1, 5, 6, 7 or 8 wherein said film is irradiatively cross-linked while maintaining said surface under oxidative conditions.

10. The method of claim 9 wherein said inner surface is polyethylene irradiated to a dosage of about 8-10 megarads.

11. A method for enhancing yield of a cook-in packaged meat product, comprising:
    (a) providing an adhering cook-in package comprising a flexible plastic container being substantially conformable to a selected meat product and having a single ply structure of hot blown, nonoriented polyethylene, said single ply including a meat product contacting surface having been irradiatively cross-linked in the presence of oxygen sufficient to cause said meat product contacting surface to adhere to the meat product during cook-in;
    (b) conforming said package about a selected meat product; and
    (c) cooking the packaged product, whereupon said meat product contacting surface adheres to said meat product to substantially prevent cook-out of fluids therefrom.

* * * * *

Disclaimer

4,411,919—*Henry B. Thompson*, Duncan, S.C. MEAT ADHERING COOK-IN PACKAGING. Patent dated Oct. 25, 1983. Disclaimer filed Apr. 1, 1991, by the assignee, W. R. Grace & Co.

Hereby enters this disclaimer to claims 1-11 of said patent.
[ *Official Gazette June 11, 1991* ]